(12) United States Patent
You

(10) Patent No.: US 7,768,596 B2
(45) Date of Patent: Aug. 3, 2010

(54) LIQUID CRYSTAL DISPLAY DEVICE THAT IS ADAPTIVE FOR DRIVING PLURALITY OF LIQUID CRYSTAL DISPLAY PANELS BY USE OF ONE BACKLIGHT

(75) Inventor: Tae Ho You, Incheon (KR)

(73) Assignee: LG Display Co., Ltd., Seoul (KR)

( * ) Notice: Subject to any disclaimer, the term of this patent is extended or adjusted under 35 U.S.C. 154(b) by 367 days.

(21) Appl. No.: 11/110,752

(22) Filed: Apr. 21, 2005

(65) Prior Publication Data

US 2005/0237444 A1  Oct. 27, 2005

(30) Foreign Application Priority Data

Apr. 23, 2004 (KR) .................. 10-2004-0028212

(51) Int. Cl.
*G02F 1/1333* (2006.01)
*G02F 1/1335* (2006.01)
*G02F 1/133* (2006.01)
*F21V 7/04* (2006.01)

(52) U.S. Cl. .............. 349/73; 349/58; 349/59; 349/60; 349/65; 362/632; 362/633; 362/634

(58) Field of Classification Search ............ 349/73, 349/58–60, 65; 362/632–634
See application file for complete search history.

(56) References Cited

U.S. PATENT DOCUMENTS

| 6,871,975 | B2 * | 3/2005 | Chuang ................ 362/27 |
| 6,974,221 | B2 * | 12/2005 | Wu et al. ............. 362/29 |
| 2003/0160910 | A1 * | 8/2003 | Tanaka et al. ......... 349/65 |
| 2003/0206253 | A1 * | 11/2003 | Cho .................. 349/61 |
| 2004/0036818 | A1 * | 2/2004 | Kim et al. ............ 349/58 |
| 2004/0110540 | A1 * | 6/2004 | Sato et al. ........... 455/566 |
| 2004/0264211 | A1 * | 12/2004 | Han et al. ............ 362/561 |

FOREIGN PATENT DOCUMENTS

JP  2002-0645599  *  2/2002

* cited by examiner

*Primary Examiner*—David Nelms
*Assistant Examiner*—Lauren Nguyen
(74) *Attorney, Agent, or Firm*—Birch, Stewart, Kolasch & Birch, LLP

(57) ABSTRACT

A liquid crystal display device according to an embodiment of the present invention includes at least two liquid crystal display panels; a lamp to irradiate light on each of the liquid crystal display panels; a transparent case to cover the lamp; and a hinge part to provide a hinge function to each of the liquid crystal display panels.

18 Claims, 7 Drawing Sheets

LIQUID CRYSTAL DISPLAY DEVICE THAT IS ADAPTIVE FOR DRIVING PLURALITY OF LIQUID CRYSTAL DISPLAY PANELS BY USE OF ONE BACKLIGHT

This application claims the benefit of the Korean Patent Application No. 10-2004-28212 filed on Apr. 23, 2004, which is hereby incorporated by reference.

BACKGROUND OF THE INVENTION

1. Field of the Invention

The present invention relates to a liquid crystal display device, and more particularly to a liquid crystal display device that is adaptive for driving a plurality of liquid crystal display panels by use of one backlight, thereby securing the mobility of a liquid crystal display panel and reducing its weight as well as its manufacturing cost.

2. Description of the Related Art

Generally, a liquid crystal display (hereinafter referred to as "LCD") is on a broadening trend in its application scope due to its characteristic of lightness, thinness, low power consumption drive and so on. According to the trend, the liquid crystal display device is used in office automation OA equipment, audio/video equipment and so on. On the other hand, the liquid crystal display device controls the transmissivity of light beam in accordance with a video signal applied to a plurality of control switches that are arranged in a matrix shape, thereby displaying a desired picture on a screen.

The liquid crystal display device is not a self-luminous display device, thus it requires a light source like a backlight. The backlight for the liquid crystal display is divided into a flat type and an edge type. The flat type backlight has a plurality of lamps arranged in a plane in order to illuminate a large-sized or middle-sized liquid crystal display panel with light. And, a diffusion panel is installed between a fluorescent lamp and the liquid crystal display panel, and the gap between the liquid crystal display panel and the diffusion panel is maintained to be uniform. The edge type backlight has a lamp installed at the outer part of flat panel in order to illuminate a large-sized or middle-sized liquid crystal display panel with light, wherein the light generated from the lamp is incident to the entire surface of the liquid crystal display panel by use of a transparent light guide panel Referring to FIG. 1, an edge type liquid crystal display device according to the related art includes a liquid crystal-display panel 2, a backlight unit to illuminate the liquid crystal display panel 2 with light, a support main 16 to have the backlight unit put therein, and a case top 6 to encompass the edge of the liquid crystal display panel 2 and the side wall of the support main 16.

The liquid crystal display panel 2 has liquid crystal cells arranged in an active matrix shape between an upper glass substrate and a lower glass substrate, and a thin film transistor is installed in each liquid crystal cell to switch video signals. The refractive index of each liquid crystal cell is changed in accordance with the video signal, thereby displaying a picture corresponding to the video signal. In this way, a tape carrier package (not shown), where a driver IC for applying drive signals to the thin film transistor is mounted, is stuck onto the lower substrate of the liquid crystal display panel 2. Also, polarizing sheets 8, 18 are each installed in the front and rear surfaces of the liquid crystal display panel 2. Herein, the polarizing sheets 8, 18 have a function of improving the viewing angle of the picture displayed by the liquid crystal cells.

The backlight unit includes a lamp 36 to receive power from an external power source and illuminate the liquid crystal display panel 2 with light; a light guide panel 12 to make the light progress toward the liquid crystal display panel 2, wherein the light is incident through a light entering part formed at the side surface opposite to the lamp 36; a lamp housing 34 to cover the lamp 36 as well as the light entering part of the light guide panel 12; a reflecting sheet 14 arranged at the rear surface of the light guide panel 12; a plurality of optical sheets 10 to improve the efficiency of the light coming out of the light guide panel 12, thereby illuminating the liquid crystal display panel 2 therewith.

The lamp 36 includes a high voltage electrode and a low voltage electrode formed at both ends of a glass tube, a high voltage wire 44 connected to the high voltage electrode by soldering, and a low voltage wire 42 connected to the low voltage electrode by soldering. Herein, the electrodes soldered with the wires 42, 44 are covered with an insulating holder.

The lamp housing 34 increases the efficiency of the light being incident from the lamp 36 and prevents the loss of light.

The light guide panel 12 has a designated tilt angle to guide the light incident from the lamp 36 to the liquid crystal display panel 2. At this moment, the reflecting sheet 14 makes the light generated from the lamp 36 guided to the light guide panel 12, and prevents the light loss generated from the lamp 36.

The optical sheets 10 makes the light incident slantingly from the surface of the light guide panel 12 vertically progress toward the liquid crystal display panel 2. In other words, the optical sheets 10 act to raise the propagation direction of the light up from the surface of the optical sheets 10.

The case top 6 is manufactured to have a shape of square belt with an orthogonally bent plane surface and side surface parts. The case top 6 encompasses the edge of the liquid crystal display panel 2 and the side surface of the support main 16.

The support main 16 is a mold of plastic material and its inner side wall is formed to be a stepped face. The backlight unit and the liquid crystal display panel 2 are deposited in the stepped face of the support main 16.

Herein, the illuminating method of the light generated from the backlight unit of FIG. 1 is described in detail.

Firstly, the lamp 36 receives power through the wires 42, 44 to generate light. The light from the part of the lamp facing the light entering part of the light guide panel 12 is directly incident to the light guide panel 12; and the light irradiated out from the side surface and the rear surface of the lamp 36 on the basis of the light entering part of the light guide panel 12 is reflected by the inner wall of the lamp housing 34 (which covers the lamp 36) and is incident to the light guide panel 12. The linear light incident to the light guide panel 12 in this way, as shown in FIG. 2, is converted into a surface light source while passing through the light guide panel 12 to be putting out to the liquid crystal display panel 2. At this moment, the light being leaked to the rear surface of the light guide panel 12 is reflected by the reflecting sheet 14 and is deposited in the rear surface of the light guide panel 12 to be incident to the light guide panel 12 again.

Next, the light coming out of the light guide panel 12 is irradiated onto the liquid crystal display panel 2 through the optical sheets 10. The upper and lower surfaces of the display panel 2 have the polarizing sheets 8, 18, attached thereto. Herein, the optical sheets 10, as shown in FIG. 2, include diffusion sheets 10A, 10B to diffuse the light coming out of the light guide panel 12 in order for the diffused light to be irradiated onto the liquid crystal display panel 2 in an average brightness; and prism sheets 10C, 10D to receive the diffused light from the diffusion sheets 10A, 10B and to make the light go out vertically to the liquid crystal display panel 2.

The light irradiating method of the backlight unit of the edge type liquid crystal display device according to the related art requires a combination of the light guide panel 12 and the lamp housing 34 fixed to prevent the leakage of the light generated from the lamp 36. Thus there is a problem in that the light source cannot have mobility. Also, in order to drive the liquid crystal display panel 2, there is required the backlight unit that irradiates light onto the liquid crystal display panel 2. Accordingly, the liquid crystal display device that drives the liquid crystal display panel has a problem in that there is a burden in weight as well as in cost due to the installation of the backlight unit.

SUMMARY OF THE INVENTION

Accordingly, it is an object of the present invention to provide a liquid crystal display device that is adaptive for driving a plurality of liquid crystal display panels by use of one backlight, thereby securing the mobility of a liquid crystal display panel and reducing its weight as well as its manufacturing cost.

It is another object of the present invention to provide a liquid crystal display device that overcomes the limitations and disadvantages associated with the related art.

In order to achieve these and other objects of the invention, a liquid crystal display device according to an aspect of the present invention includes at least two liquid crystal display panels; and a backlight unit to provide light to the liquid crystal display panels.

According to another aspect of the present invention, there is provided a backlight structure for a displace device including a plurality of liquid crystal display panels, the backlight structure comprising: a light source to generate light, a light source housing to house the light source, and a hinge part to provide a hinging function to the liquid crystal display panels.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of the present invention will be described in detail with reference to FIGS. 3 to 7.

Figure 3:
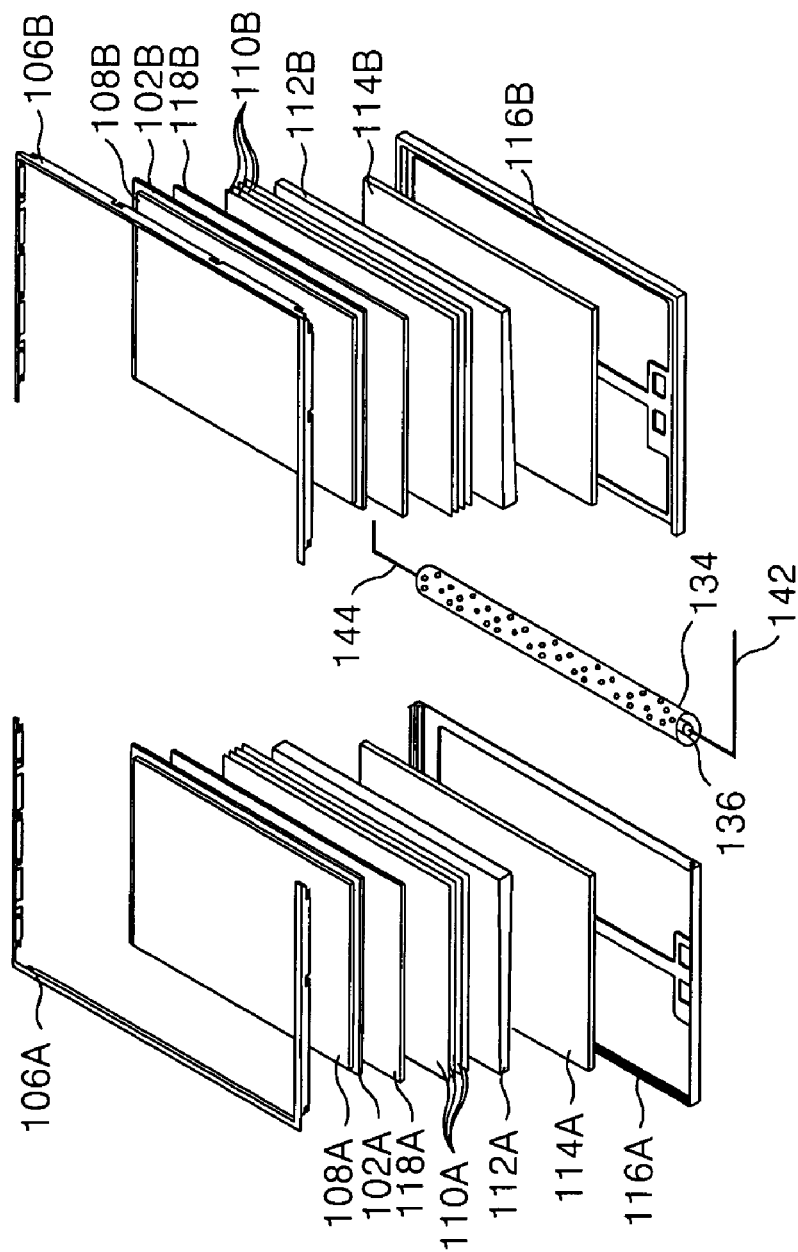
FIGS. 3 and 4 are diagrams illustrating a liquid crystal display device according to a first embodiment of the present invention.

FIG. 3 is a diagram illustrating a liquid crystal display device according to a first embodiment of the present invention.

Referring to FIG. 3, the liquid crystal display device according to the first embodiment of the present invention includes first and second liquid crystal display panels 102A, 102B; a backlight unit to irradiate light to the first and second liquid crystal display panels 102A, 102B; first and second support mains 116A, 116B to have the first and second liquid crystal display panels 102A, 102B and the backlight unit placed therein; first and second case tops 106A, 106B to encompass the edges of the first and second liquid crystal display panels 102A, 102B and the side walls of the first and second support mains 116A, 116B. All the components of the liquid crystal display device of FIG. 3 are operatively coupled.

Each of the first and second liquid crystal display panels 102A, 102B has liquid crystal cells arranged in an active matrix shape between upper and lower substrates, and has a plurality of thin film transistors for switching video signals installed in each of the liquid crystal cells. The refractive index of each of the liquid crystal cell is changed in accordance with a video signal, thereby displaying a picture corresponding to the video signal. A tape carrier package (not shown), where a driver IC to apply a drive signal to the thin film transistor is mounted, is stuck onto a lower substrate of the first and second liquid crystal display panels 102A, 102B. Also, polarizing sheets 108A, 108B, 118A, 118B are each installed at the front and rear surfaces of the first and second liquid crystal display panels 102A, 102B. Herein, the polarizing sheets 108A, 108B, 118A, 118B have a function of improving the viewing angle of the picture displayed by the liquid crystal cells.

The backlight unit includes a lamp 136 receiving power from an external power source through wires to irradiate light onto the first and second liquid crystal display panels 102A, 102B; a transparent case 134 to encircle the lamp 136; first and second light guide panels 112A and 112B arranged at both sides of the transparent case 134 and to cause the light, which is incident through a light entering part formed at the side surface facing the lamp 136, to progress toward the first and second liquid crystal display panels 102A, 102B; first and second reflecting sheets 114A, 114B arranged respectively at the rear surface of the first and second light guide panels 112A and 112B; a plurality of first and second optical sheets 110A, 110B to illuminate the first and second liquid crystal display panels 102A, 102B by improving the efficiency of the light coming out of the first and second light guide panels 112A and 1112B.

The lamp 136 includes a high voltage electrode and a low voltage electrode formed at both ends of a glass tube, a high voltage wire 144 connected to the high voltage electrode by soldering, and a low voltage wire 142 connected to the low voltage electrode by soldering. Herein, the electrodes soldered with the wires 142, 144 are covered with an insulating holder.

Figure 4:
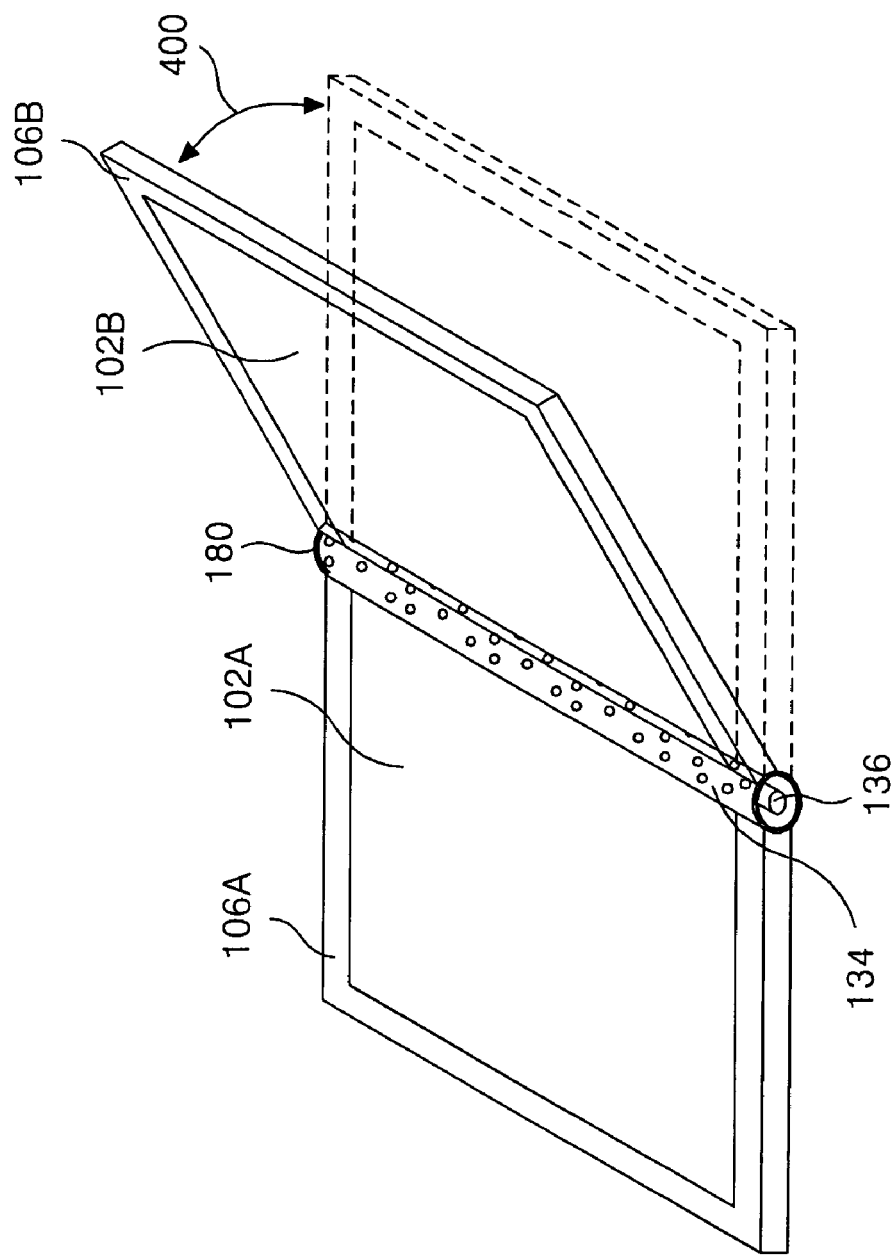

The transparent case 134 is formed of a transparent material, e.g., poly ethylene terephthalate PET, poly ethylene PE, etc., in a part where it faces the first and second light guide panels 112A, 112B, and is formed of a material, through which light is not leaked, in the other part so that the light irradiated from the lamp 136 is incident on the entire surface of the first and second light guide panel 112A, 112B. Further, as shown in FIG. 4, the transparent case 134 is disposed between the first and second liquid crystal display panels 102A, 102B such that for each of the liquid crystal display panels has a hinge function 400 with respect to the lamp 136 and the case 134. That is, the liquid crystal display panels can be hinged with respect to each other, thereby forming a certain angle with each other. Herein, the liquid crystal display device with the hinge function might include a hinge part 180 to provide the hinge function 400 and to prevent the liquid crystal display panels from being separated from each other. The hinge part 180 can be integrally formed in the backlight unit and/or the device housing such as the support mains 116A, 116B.

The first and second light guide panels 112A, 112B have a designated tilt angle and guide the light from the lamp 136 toward the first and second liquid crystal display panels 102A, 102B. At this moment, the first and second reflecting sheets 114A, 114B guide the light generated from the lamp 136 toward the first and second light guide panels 112A, 112B, and prevent the loss of the light generated from the lamp 136.

The first and second optical sheets 110A, 110B make the light, which is slantingly incident from the surface of the first and second reflecting sheets 114A and 114B and the first and second light guide panels 112A, 112B, perpendicularly progress in the first and second liquid crystal display panel 102A, 102B directions. In other words, the first and second optical sheets 110A, 110B act to raise the propagation direction of the light up from the surface of the optical sheets 110A, 110B.

The first and second case tops 106A, 106B are manufactured to have orthogonally bent plane surface and side surface parts and to have a, shape of a square/rectangular belt with one of its four sides opened. The first and second case tops 106A, 106B encompass the edges of each of the liquid crystal display panels 102A, 102B and the side surfaces of each of the support mains 116A, 116B.

The first and second support mains 116A, 116B are molds of plastic material and their inner side walls are formed to be stepped faces. A part of the backlight unit 110A, 112A, 114A, 110B, 112B, 114B and the first and second liquid crystal display panels 102A, 102B are deposited in the stepped face of the first and second support mains 116A, 116B.

Herein, the first and second case tops 106A, 106B and the first and second support mains 116A and 11.6B are combined and fitted with each other for the transparent case 134 covering the lamp 136 arranged between the first and second liquid crystal display panel 102A, 102B to have the hinge function.

Figure 5:
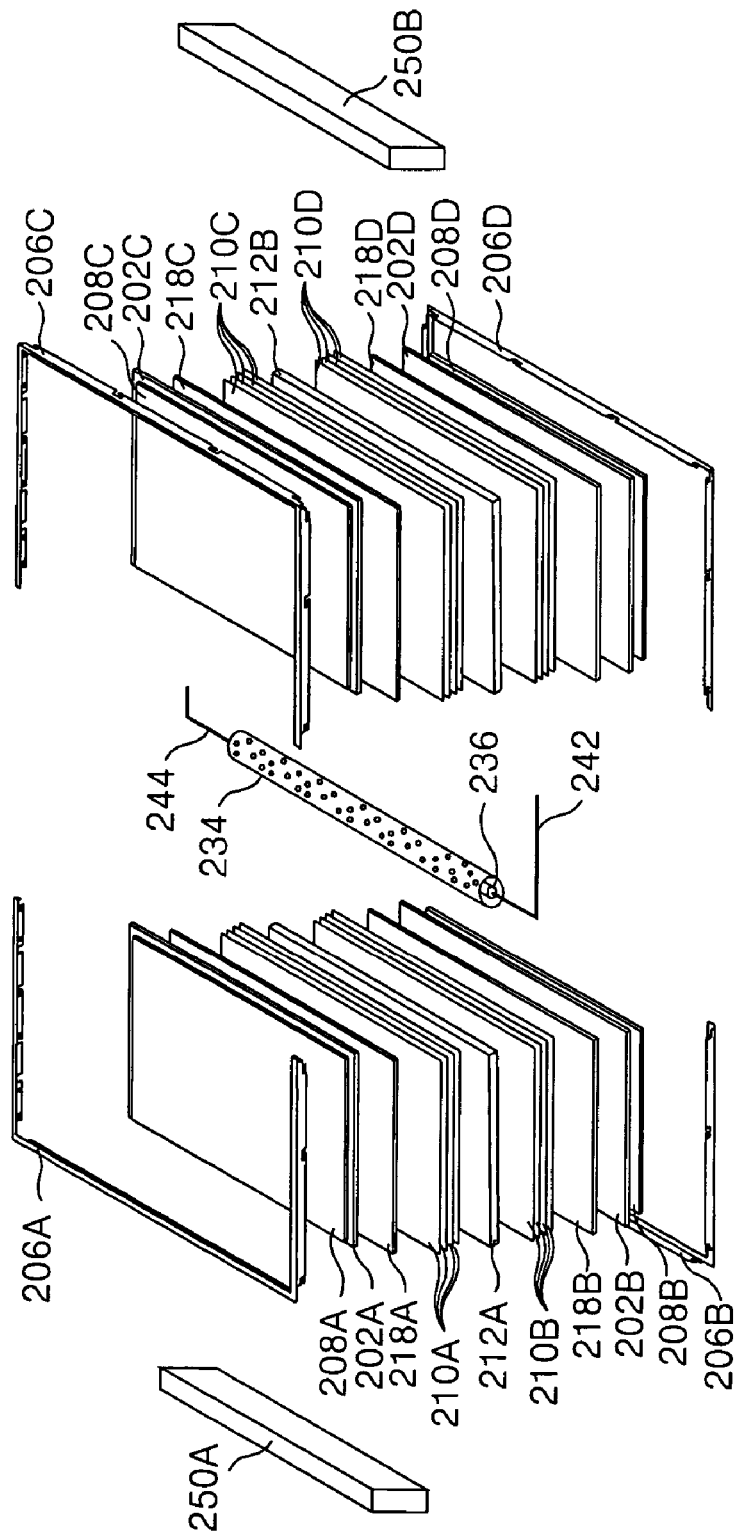
FIGS. 5 and 6 are diagrams illustrating a liquid crystal display device according to a second embodiment of the present invention.
Figure 6:
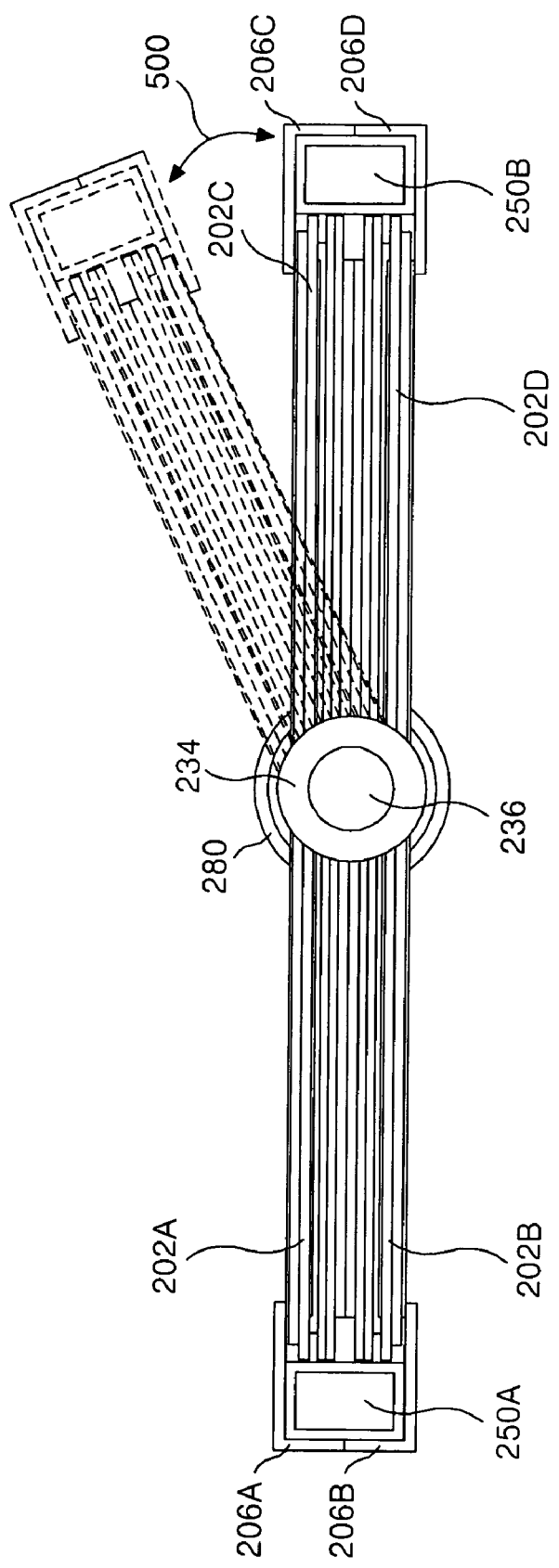

FIGS. 5 and 6 are diagrams illustrating a liquid crystal display device according to a second embodiment of the present invention.

Referring to FIG. 5, the liquid crystal display device according to the second embodiment of the present invention includes first to fourth liquid crystal display panels 202A, 202B, 202C, 202D to be opposite to each other so as to enable a both-sided and both-face display; a backlight unit disposed between the first to fourth liquid crystal display panels 202A-202D to irradiate light to the first to fourth liquid crystal display panels 202A, 202B, 202C, 202D; first and second drive circuit parts 250A, 250B, the first drive circuit part 250A to drive the first and second liquid crystal display panels 202A, 202B, the second drive circuit part 250B to drive the third and fourth liquid crystal display panels 202C, 202D; and first to fourth case tops 206A, 206B, 206C, 206D to encompass a part of the edges of the first to fourth liquid crystal display panels 202A, 202B, 202C, 202D and the side wall and the upper and lower surfaces of the first and second drive circuit parts 250A, 250B. All the components of the liquid crystal display device of FIG. 5 are operatively coupled.

Each of the first to fourth liquid crystal display panels 202A, 202B, 202C, 202D has liquid crystal cells arranged in an active matrix shape between upper and lower substrates, and has a plurality of thin film transistors for switching video signals installed in each of the liquid crystal cells. The refractive index of each of the liquid crystal cell is changed in accordance with a video signal, thereby displaying a picture corresponding to the video signal. A tape carrier package (not shown), where a driver IC to apply the drive signals generated from the first and second drive circuit parts 250A, 250B to the thin film transistor is mounted, is stuck onto a lower substrate of each of the first to fourth liquid crystal display panels 202A, 202B, 202C, 202D. Also, polarizing sheets 208A, 208B, 208C, 208D, 218A, 218B, 218C, 218D are installed at the front and rear surfaces of the first to fourth liquid crystal display panels 202A, 2021B 202C, 202D as shown. Herein, the polarizing sheets 208A, 208B, 208C, 208D, 218A, 218B, 218C, 218D have a function of improving the viewing angle of the picture displayed by the liquid crystal cells.

The backlight unit includes a lamp 236 receiving power from an external power source through wires to irradiate light; a transparent case 234 to encircle the lamp 236; first and second light guide panels 212A and 212B to cause the light, which is incident through a light entering part formed at the side surface facing the lamp 236, to progress toward the first to fourth liquid crystal display panels 202A, 202B, 202C, 202D; a plurality of first to fourth optical sheets 210A, 210B, 210C, 210D to illuminate the first and second liquid crystal display panels 202A, 202B, 202C, 202D by improving the efficiency of the light coming out of the first and second light guide panels 212A and 212B.

The lamp 236 includes a high voltage electrode and a low voltage electrode formed at both ends of a glass tube, a high voltage wire 244 connected to the high voltage electrode by soldering, and a low voltage wire 242 connected to the low voltage electrode by soldering. Herein, the electrodes soldered with the wires 242, 244 are covered with an insulating holder.

The transparent case 234 is formed of a transparent material, e.g., poly ethylene terephthalate PET, poly ethylene PE, etc., in a part where it faces the first and second light guide panels 212A, 212B, and is formed of a material, through which light is not leaked but by which the light is reflected, in the other part so that the light irradiated from the lamp 236 is incident to the entire surface of each of the first and second light guide panel 212A, 212B. Further, the transparent case 234, as shown in FIG. 6, is disposed between the liquid crystal display panels so that each of the liquid crystal display panels has a hinge function 500. Herein, the liquid crystal display device with the hinge function might include a hinge part 280 to provide the hinge function and to prevent the liquid crystal display panels from being separated from each other. The hinge part 280 can be separately or integrally formed with the backlight unit.

Figure 7:
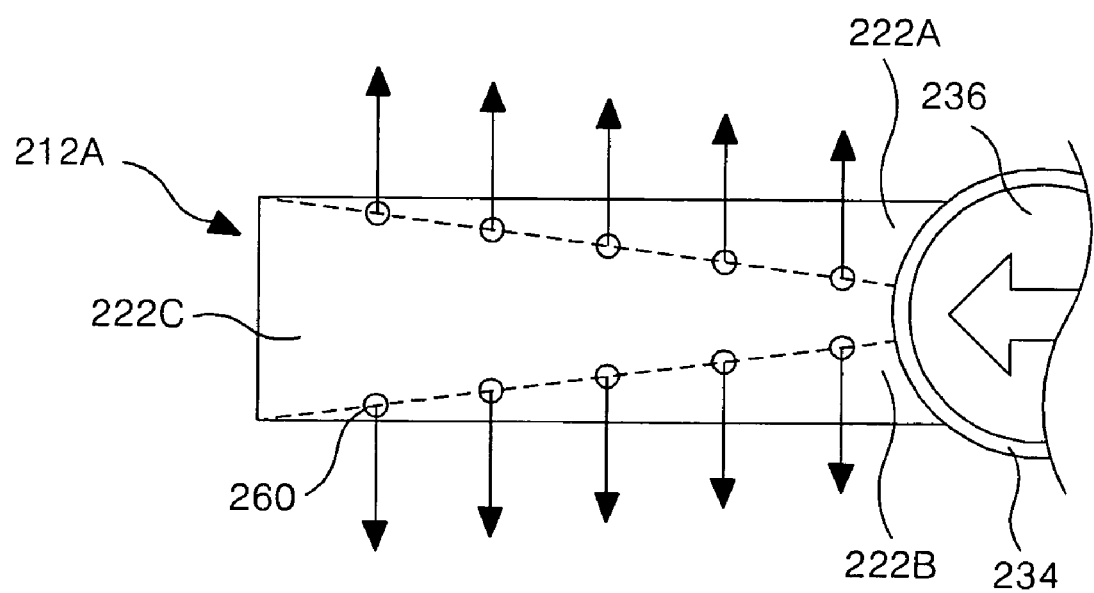
FIG. 7 is a diagram illustrating a part of a backlight unit of FIG. 6 in detail.

The first and second light guide panels 212A, 212B, as shown in FIG. 7, are formed to guide the incident light from the lamp 236 toward each of the first to fourth liquid crystal display panels 202A, 202B, 202C, 202D. To describe in detail by taking the first light guide panel 212A as an example, the first light guide panel 212A includes a first light guide member 222A to disperse the light incident from the lamp 236 by having it go through an optical pattern 260 so as to make it go out in the first liquid crystal display panel 212A direction; a second light guide member 222B being opposite to the first light guide member and to disperse the light incident from the lamp 236 by having it go through an optical pattern 260 so as to make it go out in the second liquid crystal display panel 212B direction; and an optical improvement means/member(s) 222C arranged between the first and second light guide members to support the light guide members 222A, 222B and to increase the efficiency of the light incident from the lamp 236. Herein, the optical pattern 260 is formed with one or more grooves or protrusions in one surface of the light guide panel, and the optical improvement means 222C might be manufactured of acrylic resin, PET, or PE, or any combination thereof. The second light guide panel 212B has the same structure and configuration as the first light guide panel 212A, except that it is configured to be disposed opposite to the first light guide panel 212A with the lamp 236 therebetween.

The first to fourth optical sheets 210A, 210B, 210C, 210D cause the light, which comes out of the upper and lower surface of the first and second light guide panels 212A, 212B, to perpendicularly progress in the first to fourth liquid crystal display panel 202A, 202B, 202C, 202D directions. In other words, the first to fourth optical sheets 210A, 210B, 210C, 210D act to raise the propagation direction of the light up from the surface of the first to fourth optical sheets 210A, 210B, 210C, 210D.

The first to fourth case tops 206A, 206B, 206C, 206D are manufactured to have a shape of a square/rectangular belt with one of its four sides, having orthogonally bent plane surface and side surface parts, opened. The first to fourth case tops 206A, 206B, 206C, 206D encompass the edges of the first to fourth liquid crystal display panels 202A, 202B, 202C, 202D and the side surfaces of the first and second drive circuit part 250A, 250B that drive the first to fourth liquid crystal display panels 202A, 202B, 202C, 202D.

Herein, the first to fourth case tops 206A, 206B, 206C, 206D might be combined and fitted with each other as shown in FIG. 6, for the transparent case 234, which covers the lamp 236 arranged between the first to fourth liquid crystal display panels 202A, 202B, 202C, 202D, to have the hinge function 500.

The structure of the liquid crystal display device according to the second embodiment of the present invention is described below in more detail.

Firstly, the liquid crystal display device according to the second embodiment of the present invention has the lamp 236, which generates light, with the transparent case 234 covering the lamp 236; and the first and second light guide panels 212A, 212B that are arranged at opposite sides of the transparent case 234 and receive the light generated from the lamp 236. And the first to fourth optical sheets 210A, 210B, 210C, 210D are deposited on the upper and lower parts of the first and second light guide panels 212A, 212B. Herein, the first and second light guide panels 212A, 212B, as shown in FIG. 7, have the optical pattern 260 that makes the light from the lamp 236 radiate upwardly and downwardly through the upper and lower surfaces of the first and second light guide panels 212A, 212B onto the first to fourth liquid crystal display panels 202A-202D.

Next, on the upper surface of the first and third optical sheets 210A, 210C, and on the lower surface of the second and fourth optical sheets 210B, 210D, the first to fourth liquid crystal display panels 202A, 202B, 202C, 202D are disposed. Here, the polarizing sheets 208A, 208B, 208C, 208D, 218A, 218B, 218C, 218D are stuck to the upper and lower surfaces of the first to fourth liquid crystal display panels 202A-202D. In addition, the first and second drive circuit parts 250A, 250B applying drive signals to the first to fourth liquid crystal display panels 202A, 202B, 202C, 202D are arranged at sides of the first to fourth liquid crystal display panels 202A, 202B, 202C, 202D. For instance, the first drive circuit part 250A is disposed at a side of the first and second liquid crystal display panels 202A and 202B to supply drive signals thereto, and the second drive circuit part 250B is disposed at a side of the third and fourth liquid crystal display panels 202C and 202D to supply drive signals thereto.

After then, the first to fourth case tops 206A, 206B, 206C, 206D, which cover the part of the edges of the first to fourth liquid crystal display panels 202A, 202B, 202C, 202D and the side surface of the first and second drive circuit part 250A, 250B, are combined and fitted to each other as shown in FIG. 6.

As a result, the liquid crystal display device according to the second embodiment of the present invention irradiates the light generated from one backlight unit onto the first to fourth liquid crystal display panels 202A, 202B, 202C, 202D. Thus four sub-liquid crystal display devices can be formed and driven by using a single backlight unit.

The hinge part 180, 280 in the present invention can utilize any of the known hinging mechanisms/parts, and can be integrated with the lamp housing. The hingeable liquid crystal display device of the present invention is advantageous since its hinging capability renders the device suitable in certain application. Further, each of the liquid crystal display panels in the liquid crystal display device can be selectively driven such that they can be selectively turned on/off as needed.

Figure 1:
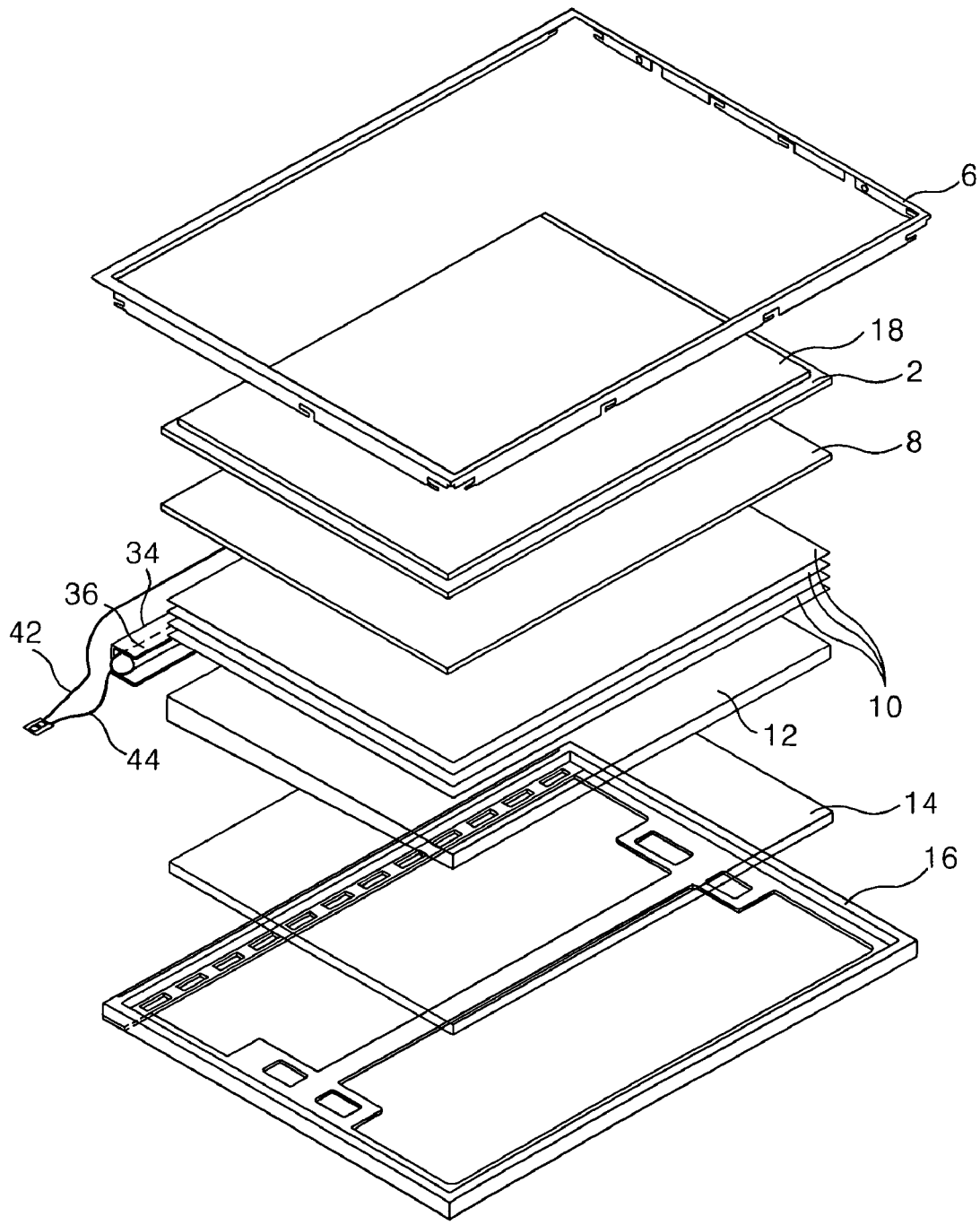
FIG. 1 is a diagram illustrating a liquid crystal display device according to a related art.
Figure 2:
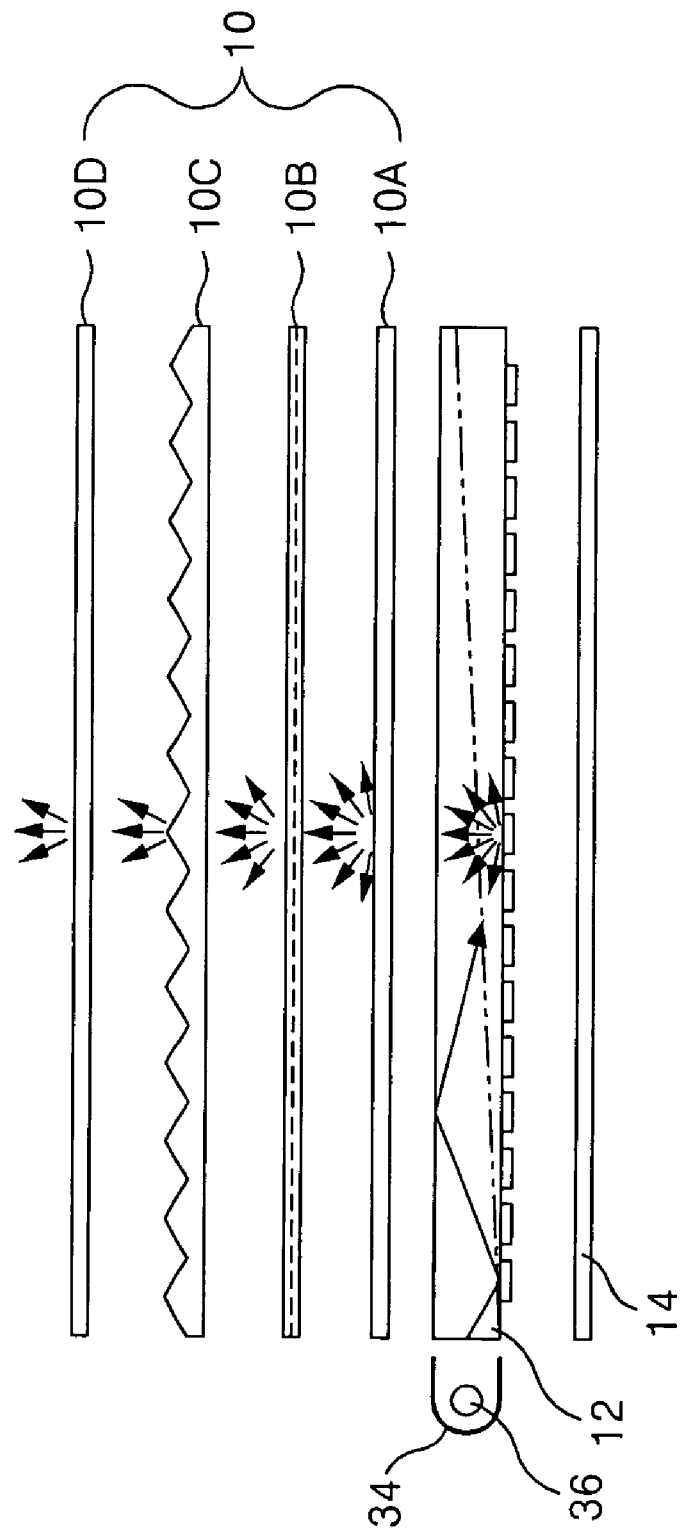
FIG. 2 is a diagram illustrating a backlight unit of FIG. 1 in detail.

The optical sheets 110A-110B and 210A-210D can be conventional optical sheets such as the optical sheets 10A-10D of FIGS. 1 and 2.

Although multiple parts (206A-206D, 106A-106B, 116A-116B) are shown to house the liquid crystal display panels, the lamp, the light guide panels, etc., it may be possible to provide a single integrated housing structure for receiving these elements and providing a hinging capability.

As described above, the liquid crystal display device according to the embodiments of the present invention drives a picture in at least two liquid crystal display panels by using and driving a single backlight. Thus the efficiency of the light generated from the backlight is maximized. It also reduces the number of backlights needed for driving the liquid crystal display panels down to one backlight. Thus the burden in weight and manufacturing cost for the display device is reduced. Further, the backlight arranged between the liquid crystal display panels has a hinge function. Therefore the liquid crystal display device can be appropriately used in situations where a hinged display device is needed, for example, an electronic book, a specific exhibit, or when there is a structural characteristic in the locations such as an exhibition hall, a museum, an art gallery, etc. For example, the liquid crystal display device of the present invention can be used in a corner area by hinging the liquid crystal display panels with respect to each other by the hinge part 280 as shown in FIG. 6.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
   first and second liquid crystal display panels;
   a light source including a lamp to generate light;
   a case to encircle the light source;
   first and second light guide panels arranged at both sides of the case and under the first and second liquid crystal display panels, respectively . . . wherein the case and light source are disposed between and along the entire facing side surfaces of the first and second liquid crystal display panels such that the light generated by the light source . . . . progresses toward the first and second liquid crystal display panels via the first and second light guide panels.

2. The liquid crystal display device according to claim 1, further comprising:
   a plurality of first optical sheets disposed between the first light guide panel and the first liquid crystal display panel; and
   a plurality of second optical sheets disposed between the second light guide panel and the second liquid crystal display panel.

3. The liquid crystal display device according to claim 1, wherein the light generated from the light source enters sides of the first and second light guide panels and exits through top surface of the first and second light guide panels to be irradiated onto the first and second liquid crystal display panels, respectively.

4. A liquid crystal display device comprising:
   first to fourth liquid crystal display panels;
   a light source including a lamp to generate light;
   a case to encircle the light source;
   first and second light guide panels arranged at both sides of the case . . . wherein the case and the light source are disposed between and along the entire second side surfaces of the first and second liquid crystal display panels and the entire second side surfaces of the third and fourth liquid crystal display panels such that the light generated by the light source . . . progresses toward the first to fourth liquid crystal display panels via the first and second light guide panels.

5. The liquid crystal display device according to claim 1, further comprising:
   first and second support casings configured to house the first and second light guide panels and the first and second liquid crystal display panels, respectively; and
   first and second case tops combined with the first and second support casings, respectively.

6. The liquid crystal display device according to claim 1, further comprising:
   a plurality of driving units to drive the first and second liquid crystal display panels.

7. The liquid crystal display device according to claim 4, wherein each of the first and second light guide panels directs the light in both upward and downward directions, thereby allowing a dual-side displaying by the liquid crystal display device.

8. A backlight structure for a display device including first to fourth liquid crystal display panels, the backlight structure comprising:
   a light source including a lamp to generate light;
   a case configured to encircle the light source;
   first and second light guide panels arranged at both sides of the case . . . wherein the case and the light source are configured to be disposed between and along the entire second side surfaces of the first and second liquid crystal display panels and the entire second side surfaces of the third and fourth liquid crystal display panels such that the light generated by the light source . . . progresses toward the first to fourth liquid crystal display panels via the first and second light guide panels.

9. The backlight structure according to claim 8, further comprising:
   a plurality of first optical sheets disposed between the first light guide panel and the first liquid crystal display panel;
   a plurality of second optical sheets disposed between the first light guide panel and the second liquid crystal display panel;
   a plurality of third optical sheets disposed between the second light guide panel and the third liquid crystal display panel; and
   a plurality of fourth optical sheets disposed between the second light guide panel and the fourth liquid crystal display panel.

10. The liquid crystal display device according to claim 1, wherein the case includes a transparent material including at least one of acrylic resin, polyethylene terephthalate, and polyethylene.

11. The liquid crystal display device according to claim 4, wherein the case includes a transparent material including at least one of acrylic resin, polyethylene terephthalate, and polyethylene.

12. The backlight structure according to claim 8, wherein the case includes a transparent material including at least one of acrylic resin, polyethylene terephthalate, and polyethylene.

13. The liquid crystal display device according to claim 1, wherein the light source is a single light source.

14. The liquid crystal display device according to claim 4, wherein the light source is a single light source.

15. The backlight structure according to claim 8, wherein the light source is a single light source.

16. The liquid crystal display device according to claim 1, wherein a central longitudinal axis of the light source substantially coincides with a center parallel axis of the first and second liquid crystal display panels.

17. The liquid crystal display device according to claim 4, wherein a central longitudinal axis of the light source substantially coincides with a center parallel axis of the first to fourth liquid crystal display panels.

18. The backlight structure according to claim 8, wherein a central longitudinal axis of the light source substantially coincides with a center parallel axis of the first to fourth liquid crystal display panels.

* * * * *